United States Patent
Cherepanov et al.

(10) Patent No.: US 12,498,944 B2
(45) Date of Patent: Dec. 16, 2025

(54) INTERACTIVE APPLICATION WIDGETS RENDERED WITH ASSISTANT CONTENT

(71) Applicant: GOOGLE LLC, Mountain View, CA (US)

(72) Inventors: Evgeny Cherepanov, Adliswil (CH); Olga Kapralova, Bern (CH); Dan Vallejo, New York, NY (US); Wendy Look, Zurich (CH); Mikhail Reutov, Zug (CH)

(73) Assignee: GOOGLE LLC, Mountain View, CA (US)

( * ) Notice: Subject to any disclaimer, the term of this patent is extended or adjusted under 35 U.S.C. 154(b) by 187 days.

(21) Appl. No.: 18/235,699

(22) Filed: Aug. 18, 2023

(65) Prior Publication Data

US 2024/0061694 A1 Feb. 22, 2024

Related U.S. Application Data

(60) Provisional application No. 63/399,109, filed on Aug. 18, 2022.

(51) Int. Cl.
| | |
|---|---|
| G06F 9/451 | (2018.01) |
| G06F 3/00 | (2006.01) |
| G06F 3/0482 | (2013.01) |
| G06F 3/0484 | (2022.01) |
| H04N 23/63 | (2023.01) |

(52) U.S. Cl.
CPC .............. *G06F 9/453* (2018.02); *G06F 3/005* (2013.01); *G06F 3/0482* (2013.01); *G06F 3/0484* (2013.01); *H04N 23/63* (2023.01)

(58) Field of Classification Search
CPC ........ G06F 9/453; G06F 3/005; G06F 3/0482; G06F 3/0484; G06F 3/04845; G06F 3/04842; H04N 23/63; H04N 21/47815; H04N 21/482
See application file for complete search history.

(56) References Cited

U.S. PATENT DOCUMENTS

| | | | |
|---|---|---|---|
| 2013/0044132 A1* | 2/2013 | Athsani | G06F 16/487 |
| | | | 345/633 |
| 2018/0336415 A1* | 11/2018 | Anorga | G06N 20/00 |
| 2019/0080168 A1* | 3/2019 | Nowak-Przygodzki | |
| | | | G06F 3/167 |
| 2019/0080169 A1* | 3/2019 | Nowak-Przygodzki | |
| | | | G06F 16/9032 |
| 2020/0005375 A1* | 1/2020 | Sharan | G06F 3/167 |

(Continued)

*Primary Examiner* — Nicholas Ulrich
(74) *Attorney, Agent, or Firm* — Gray Ice Higdon

(57) ABSTRACT

Implementations set forth herein relate to an automated assistant that can provide interactive application widgets based on their relevance to content that a user may have expressed interest in. The automated assistant can render the application widgets according to an estimated familiarity of the user with the content they expressed interest in. Each application widget can correspond to an application that can be accessed separately from the automated assistant. An application widget can be rendered at a display interface simultaneous to the user accessing the content that served as the basis for rendering the application widget. When the user interacts with the application widget, the automated assistant can communicate selection data to a corresponding application, which can respond with supplemental data that can be rendered at the display interface.

16 Claims, 9 Drawing Sheets

(56) References Cited

U.S. PATENT DOCUMENTS

| | | | |
|---|---|---|---|
| 2021/0082420 A1* | 3/2021 | Kraljic | G10L 15/1815 |
| 2023/0186624 A1* | 6/2023 | Bhatnagar | G06Q 30/0631 |
| | | | 345/633 |

* cited by examiner

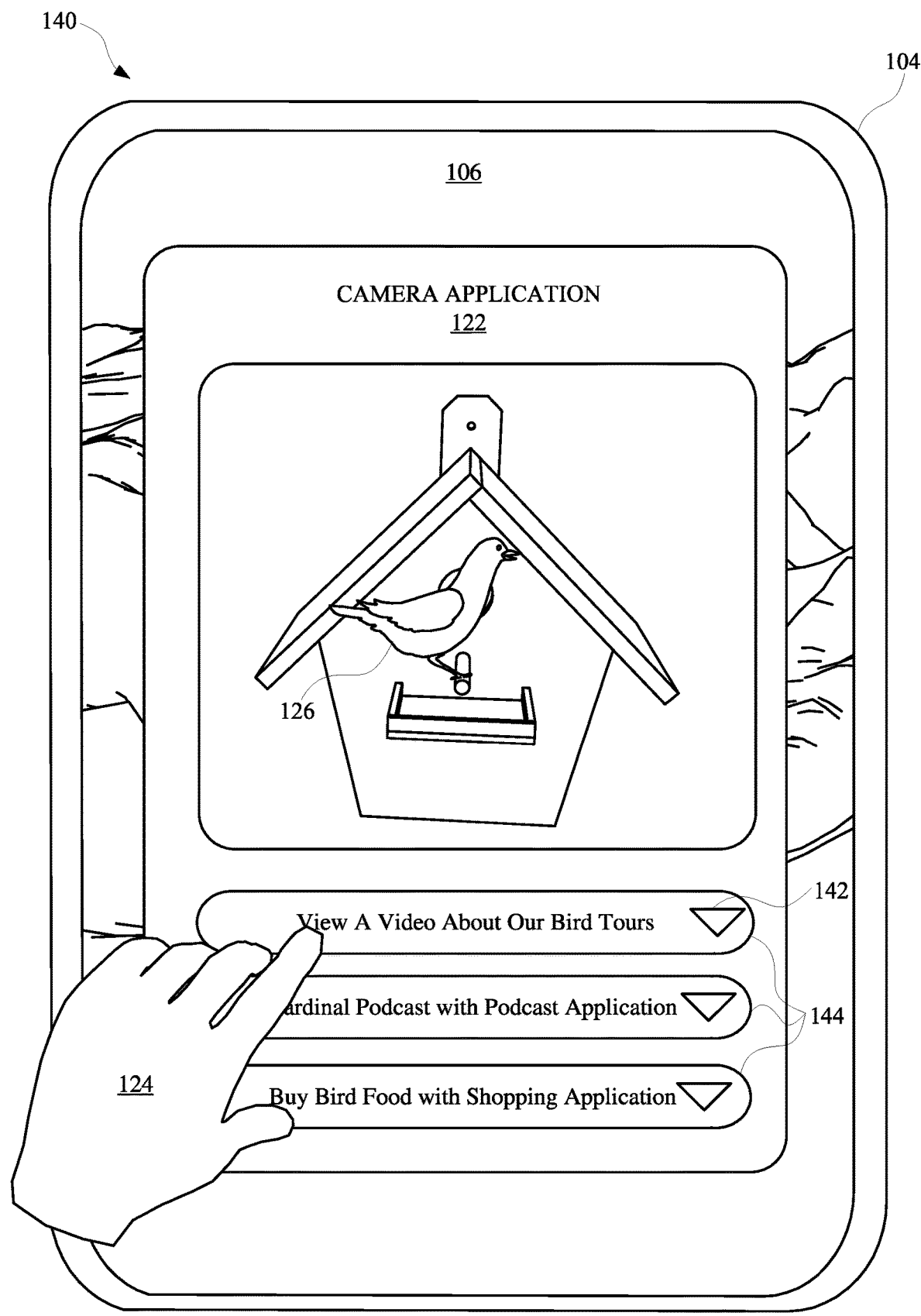
FIG. 1C1

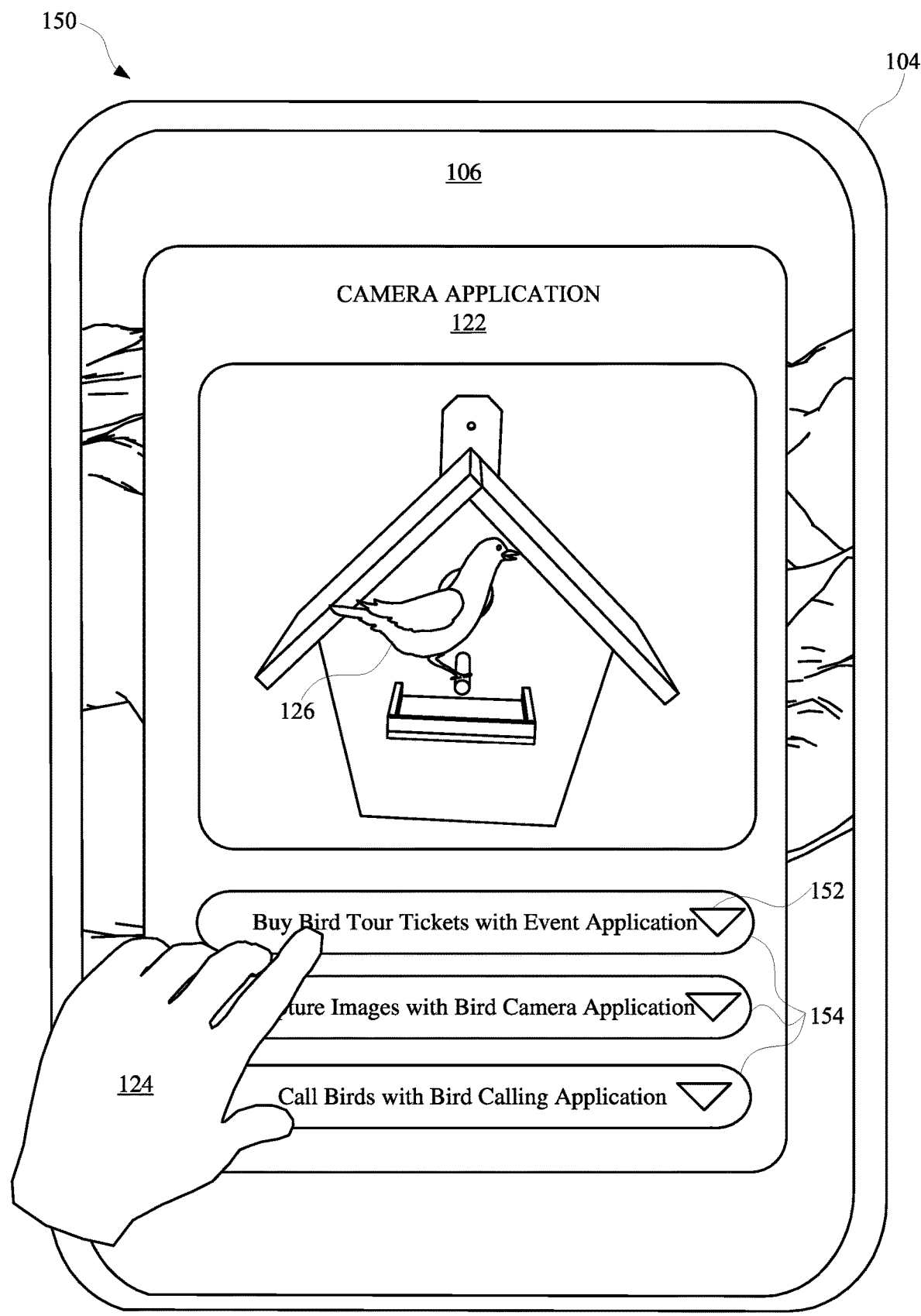
FIG. 1C2

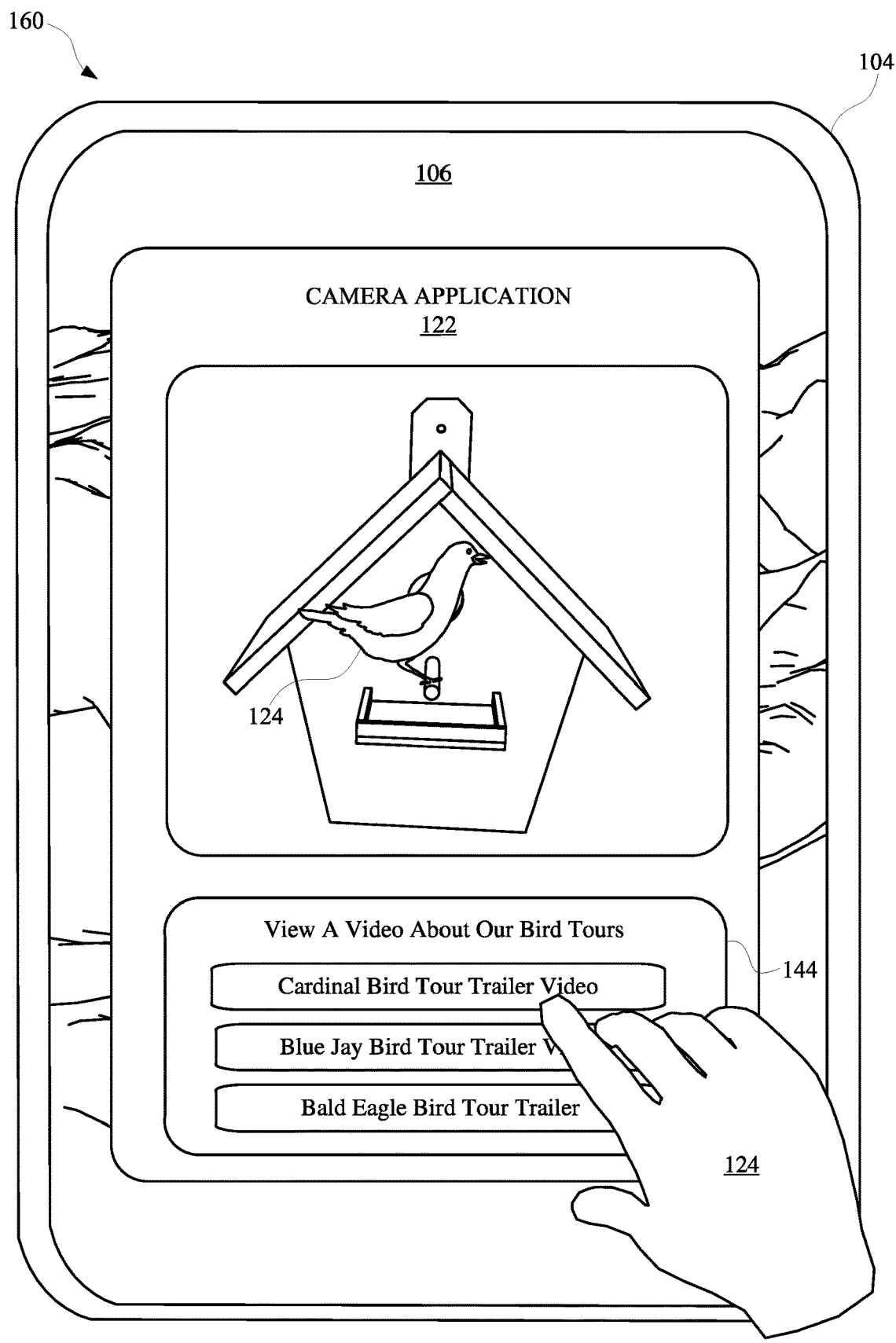
FIG. 1D1

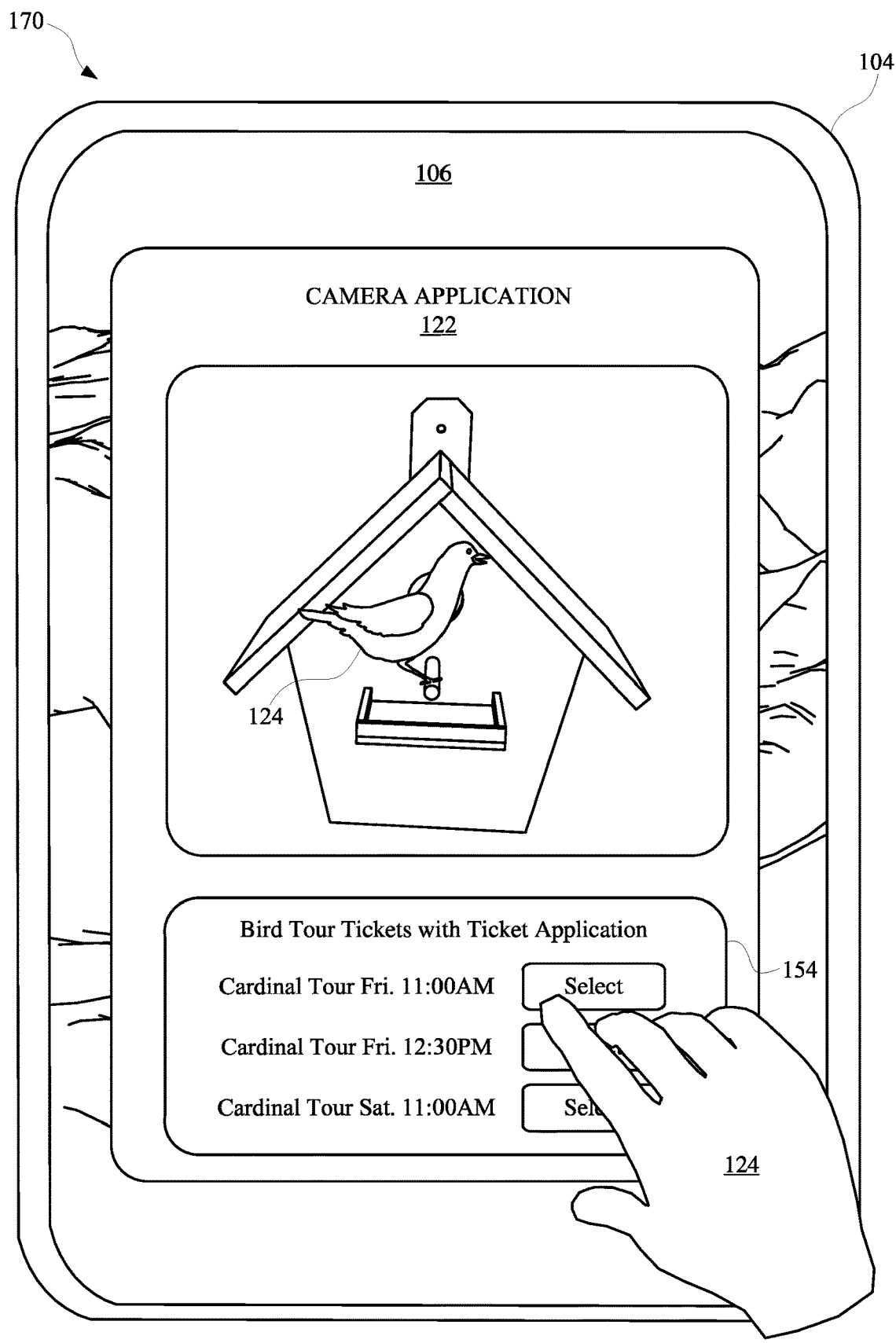
FIG. 1D2

INTERACTIVE APPLICATION WIDGETS RENDERED WITH ASSISTANT CONTENT

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input.

An automated assistant may be accessible through a device, such as a cellular phone, that has a variety of other applications loaded onto the device. For instance, a user may access a particular application from their computing device and, simultaneously, issue a spoken utterance to the automated assistant to initialize performance of a particular action (e.g., finding directions to a nearby location). However, initializing performance of certain actions can interrupt current and/or forthcoming processes of the particular application and waste resources. In some instances, duplicative processes may result from overlapping functionality of the automated assistant with other applications. For instance, the automated assistant, when executing certain actions, may not consider other functionality that some applications may provide. As a result, when a user submits an assistant request while another application is performing a particular function (e.g., rendering search results), the automated assistant may not provide any resulting content that is distinguished from, or otherwise supplements, the application content. For instance, when a user submits an assistant request (e.g., "How can I see the Statue of Liberty?") related to application content rendered the display interface (e.g., search results from an image search of "Statue of Liberty"), the automated assistant may respond with duplicative content (e.g., duplicative images or other duplicative data). This can waste power and other device resources that may have already been consumed rendering the application content at the display interface prior to the assistant request.

SUMMARY

Implementations set forth herein relate to an automated assistant that can respond to user queries with relevant application widgets that are generated using data from other applications, which are accessible separately from the automated assistant. In some implementations, an interface of query results can be customized by the automated assistant according to any relevant contextual data that can be associated with a user query. For example, when contextual data indicates that a user has some degree of familiarity with the subject matter of an input query, the automated assistant may render certain application widgets. However, when a user exhibits a lesser degree of familiarity with the subject matter, the automated assistant may render certain other application widgets.

As an example, a user can interact with the automated assistant via their portable computing device (e.g., cell phone), and provide the automated assistant with input queries through a variety of different modalities (e.g., gestures, spoken utterances, typed language, etc.). For instance, the user can be traveling as a passenger in a vehicle and direct a camera of the device towards a restaurant. A graphical representation of the restaurant can be rendered at a display interface of the device as a camera preview (i.e., a preview of what the user may be capturing an image of), and the user can tap on a location within the camera preview corresponding to the restaurant. Alternatively, or additionally, the graphical reprentation of the restaurant can be rendered at one or more other applications, such as a navigation application, a restaurant review application, a restaurant website, and/or any other related application interface. For example, the user can be navigating through a list of restaurants rendered in a restaurant review application and select an image (e.g., providing a "long tap" gesture to a display interface of the computing device) of a particular restaurant to indicate that the user is interested in seeing more information about the selected image and/or restaurant. In response, the automated assistant can process one or more images corresponding to the camera preview (or other application interface) and determine, using one or more heuristic processes and/or one or more trained machine learning models, that the user is tapping on a representation of a restaurant that is near the user.

In some implementations, the automated assistant can determine that a user is interested in receiving additional information about a particular object in response to the user providing a spoken utterance while a representation of the particular object is rendered at a computing device. For example, when a user is viewing a representation of the object via a camera preview interface, an application interface, a website, and/or other rendering, the user can provide a spoken utterance such as, "More info." In response to the spoken utterance—which may not have any parameters identifying the particular object of interest, the automated assistant can process contextual data, application data, and/or other data to determine the object (e.g., the image of the restaurant) that the user is directing their spoken utterance. In some implementations, and in response to the request from the user, the automated assistant can process a screenshot, with prior permission from the user, for determining subject matter (e.g., the restaurant) to which the user is directing their request for "more info."

In some implementations, the automated assistant can identify contextual data that may be associated with the restaurant. For example, the contextual data can characterize (with prior permission from the user) whether the user has been to the restaurant before, whether the user has previously accessed information provided by the restaurant (e.g., websites, reviews, etc.), and/or whether the user has accessed information associated with the type of restaurant. In some implementations, this contextual data can be generated, with prior permission from the user, by one or more devices, the automated assistant, and/or one or more applications associated with the user. The contextual data can be processed to generate a metric that can indicate a familiarity of the user with a particular object that the user may be expressing interest in. Based on this metric, the automated assistant can determine how to respond to the gesture from the user directed to the restaurant depicted in the camera preview.

For example, the familiarity metric can be generated based on processing data associated with the user and the restaurant using one or more heuristic processes and/or one or more trained machine learning models. In some implementations, embeddings for the user and the restaurant can be generated, and a distance between the embeddings mapped in latent space can be used as a basis for the familiarity metric. When the familiarity metric satisfies a relevance threshold and/or otherwise indicates that the user is more familiar with the restaurant, the automated assistant can render application widgets that may be suitable for someone familiar with the restaurant. For example, the automated assistant can cause a restaurant application widget to be rendered with selectable elements for reserving a table at the restaurant, and a news application widget to be rendered with selectable elements for reading news about the restaurant. When the familiarity metric does not satisfy the relevance threshold and/or otherwise indicates that the user is less familiar with the restaurant, the automated assistant can render application widgets that may be suitable for someone less familiar with the restaurant. For example, the automated assistant can cause the restaurant application widget to be rendered with selectable elements for viewing different portions of a menu, and a video application widget to be rendered with a link to a video trailer for the restaurant.

Alternatively, or additionally, the familiarity metric can be generated based on processing data provided by one or more sources of data that can be associated with the user and/or the restaurant. The data that is processed can, for example, indicate (with prior permission from the user) a number of times that the user has been at or near the restaurant (e.g., based on a travel summary of a navigation application), a number of times the user communicated with the restaurant and/or an agent of the restaurant (e.g., via email, phone call, and/or other text message), and/or a number of times the user access information about the restaurant (e.g., visiting websites associated with the restaurant). Based on this data, the automated assistant can determine a degree to which the user is familiar with the restaurant, and render application widgets for the user based on the degree of familiarity.

In this way, the automated assistant can provide query results that can be interactive using application widget data provided by one or more other applications. This can preserve computational resources by reducing a number of operations and/or steps a user may need to take to arrive at a particular interface of an application. In some implementations, application widget data can, in certain circumstances, be voluntarily provided by different applications (e.g., separate from the automated assistant) to the automated assistant, with prior permission from the user. Alternatively, or additionally, the application widget data can be solicited by the automated assistant in certain circumstances. For example, and in accordance with the aforementioned example, various applications can provide various instances of application widget data based on contextual data indicating that the user is located within a threshold distance of the restaurant. The application widget data can characterize various operations that the applications can perform, and that are relevant to the context. The automated assistant can filter and/or otherwise utilize certain instances of application data (i.e., application widget data) based on the familiarity metric. Therefore, although an application (e.g., a restaurant application) may provide different instances of application data corresponding to different operations, the automated assistant may only render a particular application widget corresponding to a particular operation (e.g., reserving a table) based on the relevancy metric.

In some implementations, a degree of familiarity users with certain subject matter (e.g., an object) can be compared to a variety of different threshold ranges, and each range can correspond to a particular set of one or more application widgets for that subject matter. For example, a user that has not visited a location (e.g., threshold range of N==0, where N is the number of visits), but has expressed interest in the location, can be shown a first set of application widgets (e.g., a widget for viewing a menu). A user that has visited a location, but has visited less than a threshold number of times (e.g., threshold range of M>N>0, where M is the "threshold number of times"), and is expressing interest in the location, can be shown a second set of application widgets (e.g., a widget for viewing a current wait time) that are different than the first set of application widgets. Additionally, or alternatively, a third set of application widgets (e.g., a widget for ordering a previously-ordered entree for deliver) can be generated for a user that has an estimated degree of familiarity that may be different from a degree of familiarity generated based on a number of visits to a location (e.g., instead the degree of familiarity may be based on a number of past delivery orders).

In some implementations, degree of familiarity can be estimated using correlations between data associated with users having a variety of degrees of familiarity. For example, the automated assistant can determine that that users who have a travel history that does not include the location of the restaurant typically view an application for viewing a menu of the restaurant. Therefore, users with less familiarity can be shown applications widgets associated with the menu in response to expressing interest in the restaurant (e.g., providing a "more info" spoken utterance when viewing a restaurant website). Alternatively, or additionally, the automated assistant can determine that users who have a travel history that does include one or more visits to the restaurant typically via an application for ordering delivery from the restaurant. Therefore, users with more familiarity can be shown applications widgets associated with ordering delivery from the restaurant in response to expressing interest in the restaurant (e.g., "long tapping" an image of the restaurant). In some implementations, the types of application widgets that are rendered can be based on types of content that the user prefers to interact with. For example, when a user is less familiar with an object and prefers video content, the user can be shown application widgets for viewing video content in response to expressing interest in the object. The video content that is rendered can be selected for users that are less familiar with the object (e.g., a video trailer for a restaurant via a video application). However, when the user is more familiar with the object and prefers audio content, the user can be shown application widgets for listening to podcasts in response to expressing interest in the object. The audio content that i srendered can be selected for users that are more familiar with the object (e.g., an audio podcast including an owner of the restaurant via a podcast application.

In some implementations, when a user is determined to be less familiar with subject matter that is being utilized as a basis for rendering a first set of application widgets, the first set of applications widgets can be selected for someone who is less familiar with the subject matter. However, the familiarity of the user with the subject matter can be change according to whether the user interacts with the first set of application widgets and how the user interacts with the application widgets. For example, when a user is less familiar with certain subject matter such as a particular restaurant, the user can be shown an application widget for viewing a restaurant trailer provided by a video application, and an application widget for viewing an encyclopedia entry for certain cuisine provided by an encyclopedia application. The automated assistant can determine that the user interacted with the application widgets and, based on this interaction, adjust an estimated degree of familiarity of the user with the restaurant. Subsequently, when the user expressed interest in the restaurant (e.g., the following month), the automated assistant can utilize the adjusted degree of familiarity to determine to render different application widgets, such as an application widget for ordering a food delivery from the restaurant and/or an application widget for reserving a table at the restaurant.

As another example, a user can interact with the automated assistant via one or more interfaces of a standalone display device (e.g., an assistant-enabled device in a kitchen of a home), and provide the automated assistant with input queries embodied in spoken utterances. The user can provide a spoken utterance such as, "Assistant, search for museums in Italy." In response, the automated assistant can provide an interface of search results, which can include one or more application widgets and, optionally, one or more internet search results. The one or more application widgets can be provided based on application data received from one or more applications that are in communication with the automated assistant—though they may not be installed on the standalone display device.

For example, the user can have a cellular phone, or other device, that includes multiple different applications installed thereon, and each application can be in communication with the automated assistant. In some implementations, each application can be supported by a server application, which can provide the automated assistant with relevant application data, with prior permission from the user. Therefore, when the user interacts with the automated assistant via their standalone display device, which may not have other applications installed thereon, the automated assistant can nonetheless access relevant application data (e.g., via the supporting server device) from applications on the cellular phone.

In accordance with the aforementioned example, the automated assistant can cause the standalone display device to render the application widgets in response to the spoken utterance (e.g., "Assistant, search for museums in Italy."). For example, the automated assistant can utilize the application data to render a travel application widget, a flight application widget, and an encyclopedia widget. In some implementations, each application widget can include functionality corresponding to an operation that the user is expected to be interested in. This can eliminate the need for the user to manually access a separate device, navigate through interfaces of an application, and control a particular function of the application. Rather, the user can rely on the automated assistant to recommend certain application widgets in response to user queries to the automated assistant. Thereafter, interactions between the user and an application widget can be communicated to the automated assistant and/or the corresponding application.

For instance, in response to the aforementioned spoken utterance, the automated assistant can render a flight application widget with functionality for viewing flights to Italy. When the user selects to view an "expanded" version of the flight application widget, a list of flights to Italy can be rendered using data received from the flight application. When the user selects a particular flight to Italy, the automated assistant can communicate the selection, made by the user, to the flight application (e.g., at a client device and/or a server device), and cause the flight application to initialize performance of booking a flight to Italy. Alternatively, or additionally, the flight application can respond to a user interaction with the flight application widget by providing supplemental data to the automated assistant (e.g., additional selectable element data for booking the flight to Italy). The automated assistant can use the supplemental data to update the rendering of the application widget, thereby seemingly allowing the user to interface with the flight application via an interface of the automated assistant.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 1A, FIG. 1B, FIG. 1C1, FIG. 1D1, FIG. 1C2, FIG. 1D2 illustrate views of a user directing a camera of their computing device towards an object, and causing an automated assistant to render relevant application widgets according to an estimated familiarity of the user with the object.

FIG. 2 illustrates a system for facilitating rendering of interactive application widgets at an assistant interface based on content that a user is accessing via the assistant interface.

FIG. 3 illustrates a method for operating an automated assistant to provide application widgets, corresponding to separate applications, based on content that a user may be interested in.

DETAILED DESCRIPTION

Figure 1A:
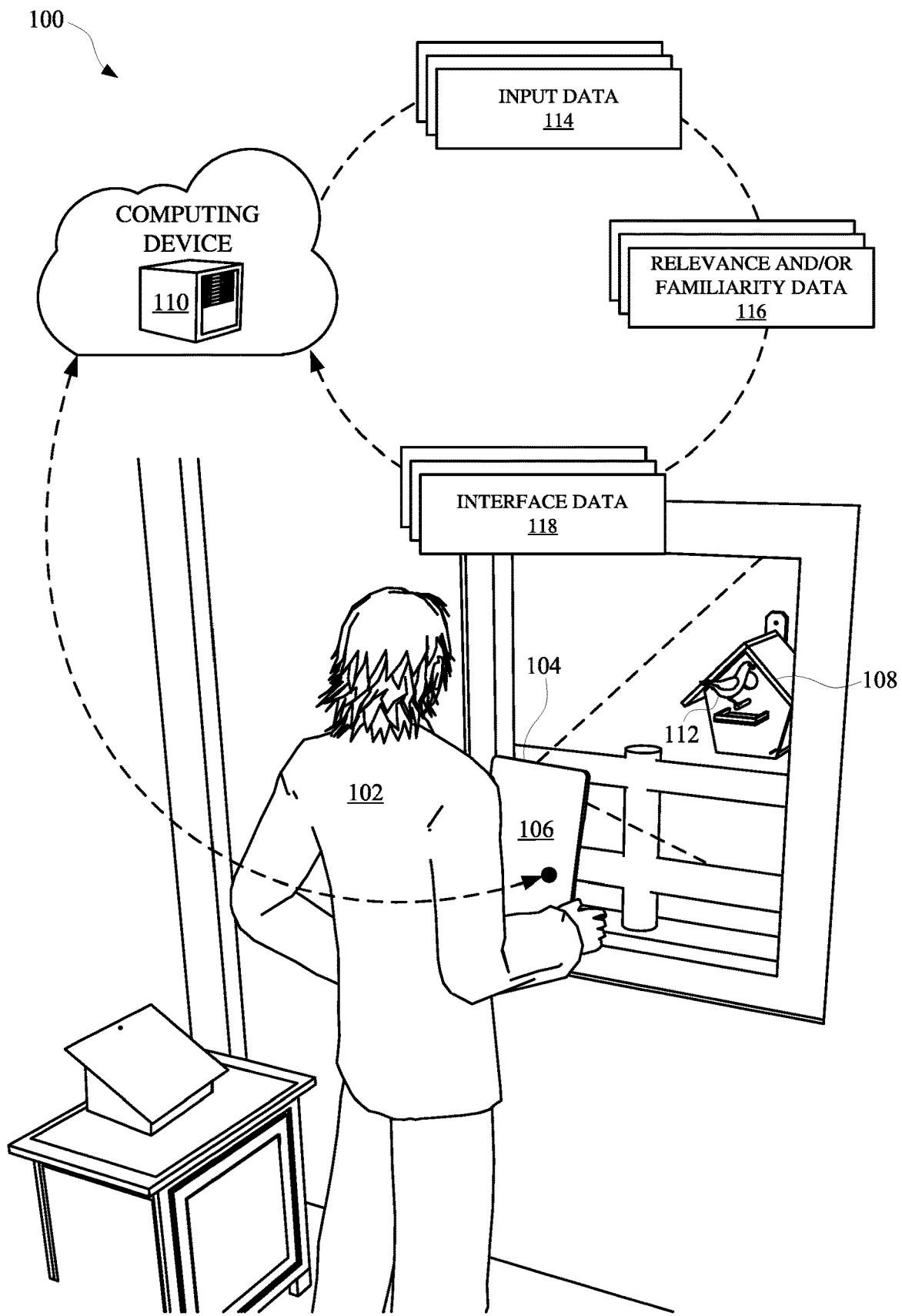
Figure 1B:
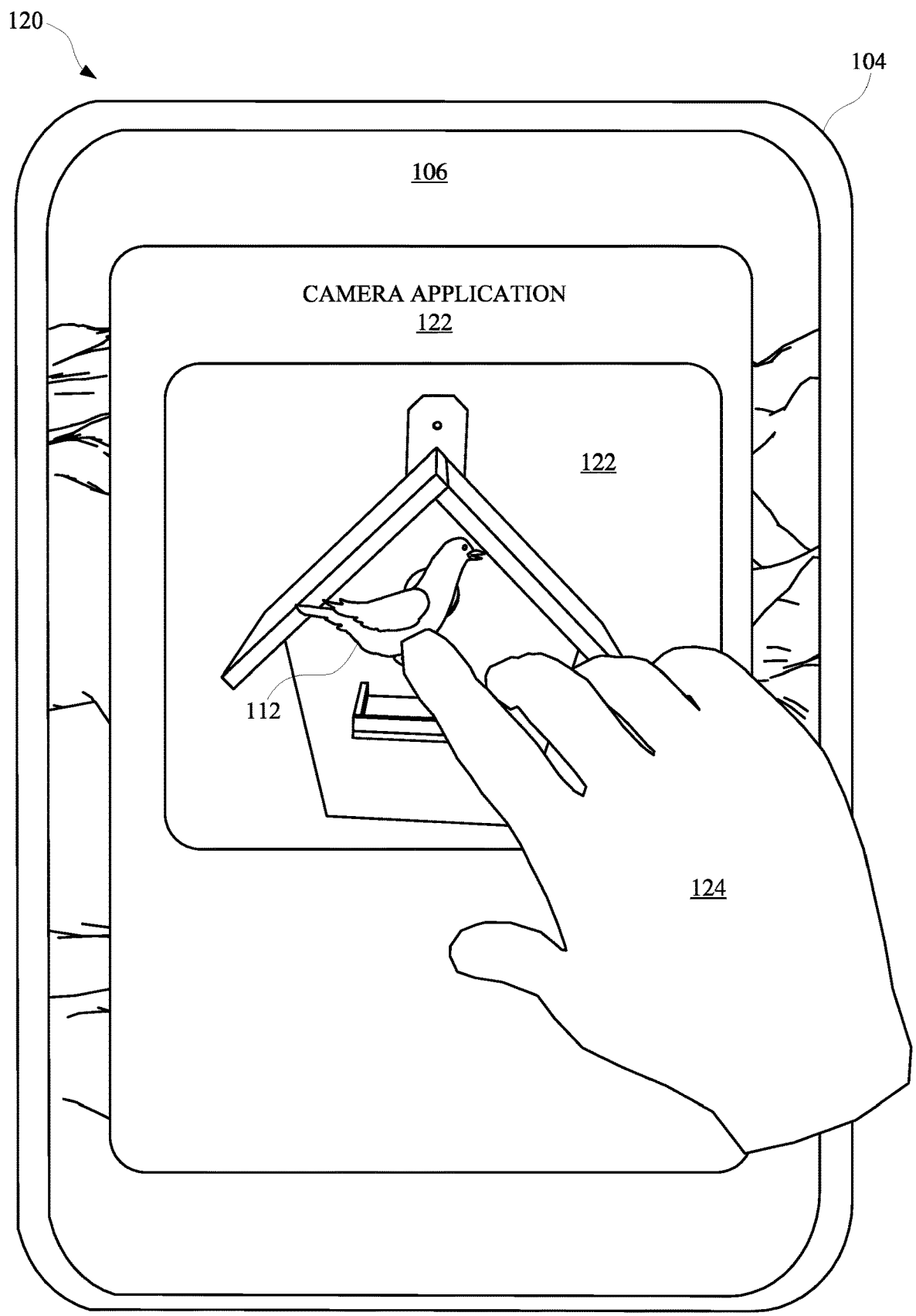

FIG. 1A, FIG. 1B, FIG. 1C1, FIG. 1D1, FIG. 1C2, and FIG. 1D2 illustrate a view 100, a view 120, a view 140, a view 160, a view 150, and a view 170, respectively, of a user 102 directing a camera of their computing device 104 towards an object, and causing an automated assistant to render relevant application widgets in response. The application widgets can be selected for rendering according to an estimated familiarity of the user 102 with the object. FIG. 1C1 and FIG. 1D1 can illustrate example application widgets that are rendered when the user 102 is less familiar with an object, and FIG. 1C2 and FIG. 1D2 can illustrate other example application widgets that are rendered when the user 102 is more familiar with the object.

For example, and as illustrated in FIG. 1A, the user 102 can be directing their computing device 104 at a bird house 108 when a bird 112 is posted on the bird house 108. The bird 112 can be represented as an image rendered at an interface of a camera application 122, as illustrated in view 120 of FIG. 1B. In some implementations, the user 102 can express interest in the object (e.g., the bird 112) by providing an input gesture to the computing device 104 (e.g., tapping with their hand 124) and/or by otherwise providing an input while viewing the object (e.g., "Assistant, tell me more."). For example, the user 102 can also express interest in the object by providing a spoken utterance to an automated assistant that is accessible via the computing device 104. The spoken utterance can be, for example, "Assistant, show me information about Cardinal birds" and/or "Assistant, show widgets."

In response to the input from the user 102, the automated assistant can process, at the computing device 104 and/or a separate computing device 110 (e.g., a server device) input data 114 characterizing the subject matter of the input. The input data can be processed using one or more heuristic processes and/or one or more trained machine learning models for determining how to respond to the input from the user 102. For example, image data characterizing the interface of the camera application 122 can be processed to determine that user 102 is tapping a portion of a display interface 106 of the computing device 104 corresponding to an image of a cardinal bird. Based on this determination, the automated assistant can access application data for determining whether to cause one or more application widgets to be rendered in response to the user 102 selecting the bird 112 image. In some implementations, the automated assistant can solicit the application data from one or more applications. Alternatively, or additionally, the one or more applications can make the application data accessible without being expressly solicited by the automated assistant.

In some implementations, input from the user 102 can be abstracted and/or otherwise secured to restrict access to raw data by other applications. For instance, input data from the user 102 can be processed to identify a "class" of input and/or an abstraction (e.g., an embedding) of the input. The class and/or other abstraction can then be made available to one or more different applications, thereby allowing the applications to provide application widget data without having access to raw input data.

The application widget data can characterize application content and/or application feature that may be relevant to the object that the user 102 has expressed interest in. In some implementations, the application data can be processed to generate relevance and/or familiarity data 116. The relevance data can characterize an estimated degree of relevance of one or more instances of the application data to the object of interest. The familiarity data can characterize an estimated degree of familiarity the user may have with the object of interest. For example, an event application can provide access to an instance of data that characterizes application content for an interactive application widget. The application content can correspond to "Bird Tours" that can be booked through the event application and/or a link to an informational video about certain bird tours. Using this application content and the input data 114, the automated assistant can generate relevance data 116 for characterizing degrees of relevance of the application content to the input data 114. Alternatively, or additionally, the automated assistant can determine an estimated degree of familiarity the user 102 may have with the object (e.g., birds in general) and select a particular application widget to render (e.g., an application widget for booking a bird tour or an application widget for viewing an informational video about bird tours) based on the familiarity metric.

In some implementations, the relevance and/or familiarity data 116 can be generated using one or more heuristic processes and/or one or more trained machine learning models. For example, the input data 114 characterizing the object can be processed to generate an input embedding that can be mapped to a latent space. The instance of data of the application data can be processed to generate an application embedding that can also be mapped to a latent space. A distance in latent space between the input embedding and the application embedding can be compared to a threshold value and/or one or more distance values for determining whether the instance of data is relevant to the input data. When the distance between the embeddings in latent space satisfies the threshold value, the automated assistant can utilize the instance of data of the application data to generate interface data 118.

In some implementations, the interface data 118 can characterize one or more application widgets 144, which can provide the user 102 with an interactive interface for initializing various application actions that may be relevant that the user 102 has expressed interest in. For example, and in accordance with the aforementioned example, the automated assistant can cause multiple different application widgets 144 corresponding to multiple different applications to be rendered. The applications can be accessible separately via the computing device 104 and/or otherwise in communication with the automated assistant via the computing device 110.

Figure 2:
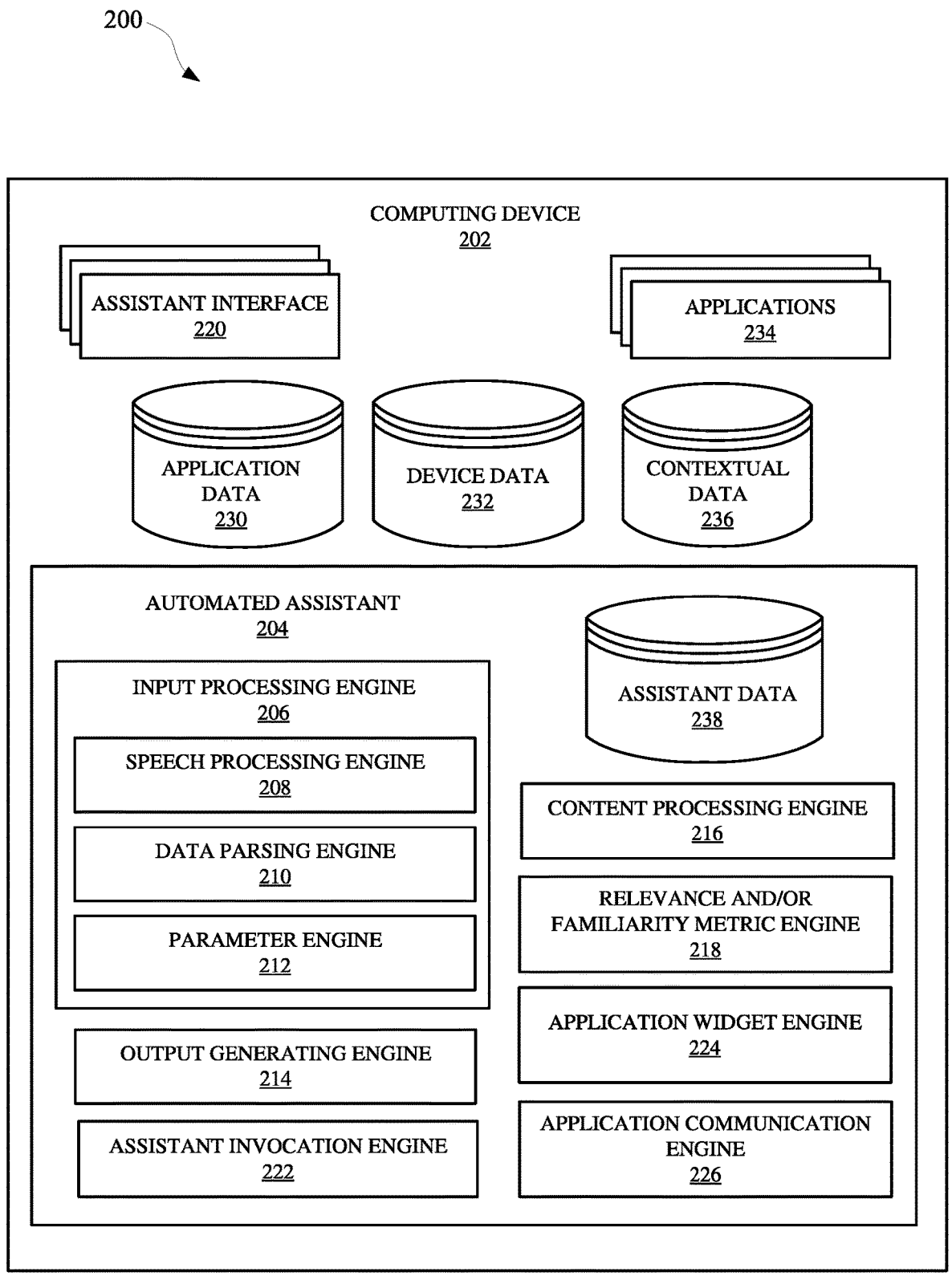

In some implementations, when the familiarity metric does not satisfy a threshold value, as illustrated in FIG. 1C1 and FIG. 1D1, the application widgets selected for rendering can correspond to an "Event Application," a "Podcast Application," and a "Shopping Application." Alternatively, or additionally, when the familiarity metric does satisfy the threshold value, as illustrated in FIG. 1C2 and FIG. 1D2, the application widgets selected for rendering can correspond to the "Event Application," a "Bird Camera Application," and a "Bird Calling Application." Content rendered at a particular application widget 144 can include textual content, links, deep links, image content, and/or any other content that can be provided by an application. For example, the "Event Application" can provide natural language content such as, "Buy Bird Tour Tickets with Event Application" and/or "View A Video About Our Bird Tours." In some implementations, this content can be characterized by the instance of data of the application data made available by the Event Application.

In some implementations, selection of a particular application widget can be based on a determined preference of a user 102 for a particular application and/or type of application over another particular application and/or another type of application. For instance, a user can have a determined preference for a video application over a podcast application. This preference can be determined based on a frequency with which the user 102 accesses certain applications and/or a context in which the user 102 prefers to access certain application. Based on this determined preference, instead of the application data from the "podcast application" being utilized for a suggested application widget, other application from a "video application" can be utilized for rendering an application widget.

In some implementations, an application widget 144 can include one or more selectable elements 142 (or one or more selectable elements 152) for interacting with the application widget 144 (or application widget 154) and/or communicating with the automated assistant and/or a corresponding application(s). For example, the application widget 144 for the Event Application can include a selectable element 142 for "expanding" and/or "revealing" content of the first application widget 144. When the user 102 selects the first application widget (e.g., the widget selected for a "less familiar" user 102 in FIG. 1C1) with their hand 124, the first application widget of the application widgets 144 can expand to reveal content for selecting informational videos to view, as illustrated in view 160 of FIG. 1D2. Alternatively, when the user 102 selects the first application widget 154 (e.g., the widget provided for the "more familiar" user 102 as illustrated in FIG. 1C2) with their hand 124, the first application widget 154 can expand to reveal content for selecting bird tour tickets to purchase, as illustrated in view 170 of FIG. 1D2.

For example, in response to the user 102 selecting the first application widget, automated assistant can cause additional content to be rendered at the display interface 106 of the computing device 104. In some implementations, the additional content can include selectable elements that, when selected, causes data to be communicated to a corresponding application. In response, the corresponding application can process the data and communicate responsive data to the automated assistant and/or the computing device 104. For example, and in FIG. 1D2, the user 102 can use their hand 124 to select a particular ticket to purchase for a particular event, and data characterizing the particular selection can be communicated to the Event Application. The data that is communicated can include one or more slot values for action intents that can be executed by the Event Application. When the application executes the corresponding action intent(s), the application can respond with responsive data (e.g., content characterizing a purchase confirmation and/or video data for an informational video), which can be rendered at the display interface 106 by the automated assistant. In some implementations, the automated assistant can render an assistant interface simultaneous to an application interface (e.g., the camera application interface) that the user initially interacted with to cause the automated assistant to render the application widgets.

FIG. 2 illustrates a system 200 for facilitating rendering of interactive application widgets at an assistant interface based on content that a user is accessing via the assistant interface. The automated assistant 204 can operate as part of an assistant application that is provided at one or more computing devices, such as a computing device 202 and/or a server device. A user can interact with the automated assistant 204 via assistant interface(s) 220, which can be a microphone, a camera, a touch screen display, a user interface, and/or any other apparatus capable of providing an interface between a user and an application. For instance, a user can initialize the automated assistant 204 by providing a verbal, textual, and/or a graphical input to an assistant interface 220 to cause the automated assistant 204 to initialize one or more actions (e.g., provide data, control a peripheral device, access an agent, generate an input and/or an output, etc.). Alternatively, the automated assistant 204 can be initialized based on processing of contextual data 236 using one or more trained machine learning models. The contextual data 236 can characterize one or more features of an environment in which the automated assistant 204 is accessible, and/or one or more features of a user that is predicted to be intending to interact with the automated assistant 204. The computing device 202 can include a display device, which can be a display panel that includes a touch interface for receiving touch inputs and/or gestures for allowing a user to control applications 234 of the computing device 202 via the touch interface. In some implementations, the computing device 202 can lack a display device, thereby providing an audible user interface output, without providing a graphical user interface output. Furthermore, the computing device 202 can provide a user interface, such as a microphone, for receiving spoken natural language inputs from a user. In some implementations, the computing device 202 can include a touch interface and can be void of a camera, but can optionally include one or more other sensors.

The computing device 202 and/or other third-party client devices can be in communication with a server device over a network, such as the internet. Additionally, the computing device 202 and any other computing devices can be in communication with each other over a local area network (LAN), such as a Wi-Fi network. The computing device 202 can offload computational tasks to the server device in order to conserve computational resources at the computing device 202. For instance, the server device can host the automated assistant 204, and/or computing device 202 can transmit inputs received at one or more assistant interfaces 220 to the server device. However, in some implementations, the automated assistant 204 can be hosted at the computing device 202, and various processes that can be associated with automated assistant operations can be performed at the computing device 202.

In various implementations, all or less than all aspects of the automated assistant 204 can be implemented on the computing device 202. In some of those implementations, aspects of the automated assistant 204 are implemented via the computing device 202 and can interface with a server device, which can implement other aspects of the automated assistant 204. The server device can optionally serve a plurality of users and their associated assistant applications via multiple threads. In implementations where all or less than all aspects of the automated assistant 204 are implemented via computing device 202, the automated assistant 204 can be an application that is separate from an operating system of the computing device 202 (e.g., installed "on top" of the operating system)—or can alternatively be implemented directly by the operating system of the computing device 202 (e.g., considered an application of, but integral with, the operating system).

In some implementations, the automated assistant 204 can include an input processing engine 206, which can employ multiple different modules for processing inputs and/or outputs for the computing device 202 and/or a server device. For instance, the input processing engine 206 can include a speech processing engine 208, which can process audio data received at an assistant interface 220 to identify the text embodied in the audio data. The audio data can be transmitted from, for example, the computing device 202 to the server device in order to preserve computational resources at the computing device 202. Additionally, or alternatively, the audio data can be exclusively processed at the computing device 202.

The process for converting the audio data to text can include a speech recognition algorithm, which can employ neural networks, and/or statistical models for identifying groups of audio data corresponding to words or phrases. The text converted from the audio data can be parsed by a data parsing engine 210 and made available to the automated assistant 204 as textual data that can be used to generate and/or identify command phrase(s), intent(s), action(s), slot value(s), and/or any other content specified by the user. In some implementations, output data provided by the data parsing engine 210 can be provided to a parameter engine 212 to determine whether the user provided an input that corresponds to a particular intent, action, and/or routine capable of being performed by the automated assistant 204 and/or an application or agent that is capable of being accessed via the automated assistant 204. For example, assistant data 238 can be stored at the server device and/or the computing device 202, and can include data that defines one or more actions capable of being performed by the automated assistant 204, as well as parameters necessary to perform the actions. The parameter engine 212 can generate one or more parameters for an intent, action, and/or slot value, and provide the one or more parameters to an output generating engine 214. The output generating engine 214 can use the one or more parameters to communicate with an assistant interface 220 for providing an output to a user, and/or communicate with one or more applications 234 for providing an output to one or more applications 234.

In some implementations, the automated assistant 204 can be an application that can be installed "on-top of" an operating system of the computing device 202 and/or can itself form part of (or the entirety of) the operating system of the computing device 202. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 202. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 202 can include one or more applications 234 which can be provided by a third-party entity that is different from an entity that provided the computing device 202 and/or the automated assistant 204. An application state engine of the automated assistant 204 and/or the computing device 202 can access application data 230 to determine one or more actions capable of being performed by one or more applications 234, as well as a state of each application of the one or more applications 234 and/or a state of a respective device that is associated with the computing device 202. A device state engine of the automated assistant 204 and/or the computing device 202 can access device data 232 to determine one or more actions capable of being performed by the computing device 202 and/or one or more devices that are associated with the computing device 202. Furthermore, the application data 230 and/or any other data (e.g., device data 232) can be accessed by the automated assistant 204 to generate contextual data 236, which can characterize a context in which a particular application 234 and/or device is executing, and/or a context in which a particular user is accessing the computing device 202, accessing an application 234, and/or any other device or module.

While one or more applications 234 are executing at the computing device 202, the device data 232 can characterize a current operating state of each application 234 executing at the computing device 202. Furthermore, the application data 230 can characterize one or more features of an executing application 234, such as content of one or more graphical user interfaces being rendered at the direction of one or more applications 234. Alternatively, or additionally, the application data 230 can characterize an action schema, which can be updated by a respective application and/or by the automated assistant 204, based on a current operating status of the respective application. Alternatively, or additionally, one or more action schemas for one or more applications 234 can remain static, but can be accessed by the application state engine in order to determine a suitable action to initialize via the automated assistant 204.

The computing device 202 can further include an assistant invocation engine 222 that can use one or more trained machine learning models to process application data 230, device data 232, contextual data 236, and/or any other data that is accessible to the computing device 202. The assistant invocation engine 222 can process this data in order to determine whether or not to wait for a user to explicitly speak an invocation phrase to invoke the automated assistant 204, or consider the data to be indicative of an intent by the user to invoke the automated assistant—in lieu of requiring the user to explicitly speak the invocation phrase. For example, the one or more trained machine learning models can be trained using instances of training data that are based on scenarios in which the user is in an environment where multiple devices and/or applications are exhibiting various operating states. The instances of training data can be generated in order to capture training data that characterizes contexts in which the user invokes the automated assistant and other contexts in which the user does not invoke the automated assistant. When the one or more trained machine learning models are trained according to these instances of training data, the assistant invocation engine 222 can cause the automated assistant 204 to detect, or limit detecting, spoken invocation phrases from a user based on features of a context and/or an environment.

In some implementations, the system 200 can include a content processing engine 216 that can employ one or more heuristic processes and/or one or more trained machine learning models to process (with prior permission from the user) content that a user may be viewing and/or requesting to view (e.g., images of a restaurant). The content processing engine 216 can process, for example, image frames, screenshots, audio data, image data, input data, output data, contextual data, and/or any other data that can be relevant to content being rendered at a device, and/or requested to be rendered at a device. In some implementations, content data can be generated based on the content processing, and the content data can characterize one or more objects that may be represented by the content (e.g., a name of a city and/or landmark, item name, description, etc.).

In some implementations, the system 200 can include a relevance and/or familiarity metric engine 218. The relevance and/or familiarity metric engine 218 can process data for determining a degree of familiarity that a user may have with certain content, and/or a degree of relevance certain content may have to an object that the user may be interested in. For example, a familiarity metric can be generated based on content data generated by the content processing engine 216, and can characterize an estimated degree of familiarity that a user may have with the content. In some implementations, the familiarity metric can be generated using one or more heuristic processes and/or one or more trained machine learning models. For example, a content embedding can be generated using the content data, and the content embedding can be mapped to a latent space in which other embeddings have been mapped. The other embeddings can correspond: to other content the user may have accessed, prior interactions between the user and the automated assistant, prior interactions between the user and one or more devices and/or applications, and/or any other data that can be accessed via a computing device. A distance in latent space between the content embedding and one or more other embeddings can indicate a degree of familiarity that a user may have with the content data, and can therefore serve as a basis for generating a familiarity metric. Alternatively, or additionally, the familiarity metric can be generated based on a comparison between the content data and data that is represented by a personal knowledge graph and/or public knowledge graph associated with the user.

In some implementations, the relevance and/or familiarity metric engine 218 can process data for determining a degree of relevance that instances of application data 230 may have to the content data and/or contextual data 236. The degree of relevance can be represented by a relevance metric, which can be generated using one or more heuristic processes and/or one or more trained machine learning models. For example, application data 230 (e.g., application widget data) provided by one or more applications, which may or may not be installed on the system 200, can be processed using one or more trained machine learning models to generate an application embedding. Additionally, or alternatively, the content data and/or contextual data 236 can be processed to generate a content embedding, which can be mapped to a latent space with the application embedding(s). A distance between each application embedding and the content embedding can be determined and used as a basis for generating a respective relevance metric for each instance of application data. When a relevance metric for a particular instance of application data satisfies a relevance threshold, the automated assistant 204 can utilize the particular instance of data to render an application widget for a user.

For example, relevance metrics and/or familiarity metrics for various instances of application data can be utilized by an application widget engine 224 of the system 200 to generate interface data. The interface data can characterize one or more application widgets that can be rendered with content that the user is viewing and/or has requested to view. Each application widget can include content provided by a respective application that is accessible separately from the automated assistant, and can allow the user to interact with the respective application without navigating away from a currently-active interface. In some implementations, one or more of the rendered application widgets can be expanded in response to an input from the user to view additional content, such as additional selectable GUI elements, images, videos, textual content, audio, and/or any other content that can be rendered via a computing device.

In some implementations, when the user provides a user input to interact with the application widget, an application communication engine 226 can communicate the user input to one or more corresponding applications. In some implementations, an application that receives the user input can respond with supplemental data, which can characterize additional content for the user to interact with via the selected application widget. For example, when the application widget corresponds to a navigation application, the application widget can be rendered with a map of a particular location associated with the content being viewed by the user (e.g., content from a recipe website). When the user selects a particular location on the rendered map, the navigation application can provide supplemental data that can provide additional information regarding the particular location. For instance, the supplemental data can characterize additional selectable GUI elements for viewing directions to the location and/or operating hours of the location, without requiring the user to navigate away from the initial content they were viewing (e.g., content from the recipe website).

Figure 3:
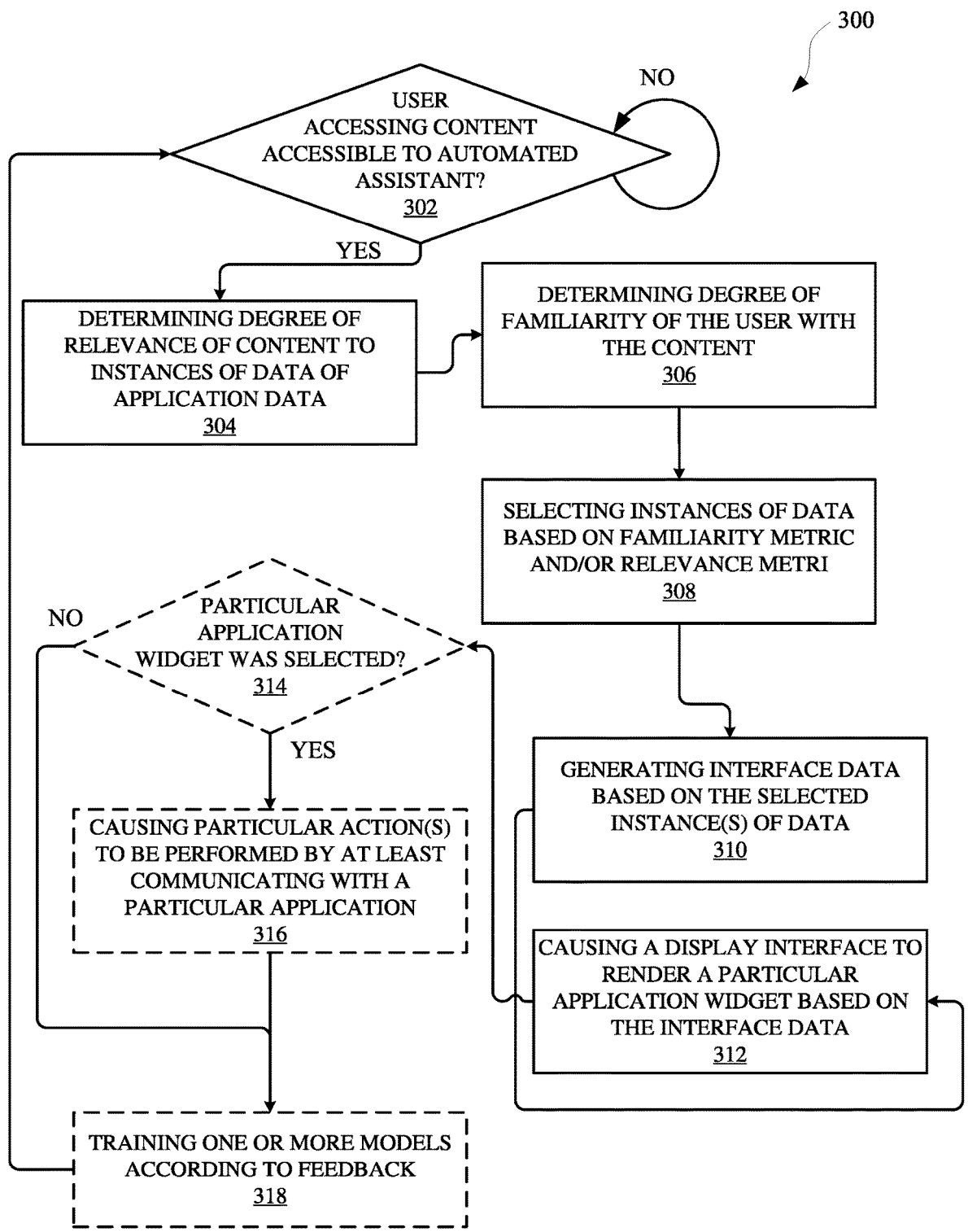

FIG. 3 illustrates a method 300 for operating an automated assistant to provide application widgets, corresponding to separate applications, based on content that a user may be interested in, and/or whether the user is familiar with the content. The method 300 can be performed by one or more computing devices, applications, and/or any other apparatus or module that can be associated with an automated assistant. The method 300 can include an operation 302 of determining, with prior permission from a user, whether the user is accessing content that is accessible to the automated assistant. The user can access be accessing the content through a variety of different modalities. For example, the content can include information rendered in response to a request, from the user to the automated assistant, for the automated assistant to render certain content. Alternatively, or additionally, the content can include information rendered by one or more other applications that can be accessed via a computing device associated with the user.

For example, the content can include an object represented in a camera interface of a camera application, certain information represented in an application interface of the automated assistant, and/or any other content that can be rendered via an interface of a device. In some implementations, and with prior permission from the user, certain rendered content can be accessed by the automated assistant using an application programming interface (API), screenshot(s) of an interface that includes the content, and/or any other modality for allowing the automated assistant to access certain content. For example, the automated assistant can, with prior permission from the user, utilize one or more heuristic processes and/or trained machine learning models to process image frames of a video, screenshots, and/or other device outputs for determining an application and/or content being rendered at an interface of the computing device. Alternatively, or additionally, the content can be an output rendered by the automated assistant in response to an input query from the user to the automated assistant.

When the user is determined to be accessing content that is accessible to the automated assistant, the method 300 can proceed from the operation 302 to an operation 304, otherwise, the automated assistant can standby for other tasks. The operation 304 can include determining a degree of relevance of the content being accessed to instances of data of application data. Each instance of data can correspond to a particular application that is associated with the user and/or the automated assistant. In some implementations, one or more different application programming interfaces (APIs) can be utilized by the automated assistant and/or the applications to provide access to the instances of data. A degree of relevance of the content to an instance of data can be determined using one or more heuristic processes and/or one or more trained machine learning models. For example, an application embedding can be generated based on a particular instance of data, and a content embedding can be generated based on the content. Each embedding can be generated using one or more trained machine learning models, and the embeddings can be mapped to a latent space. A distant between each application embedding and the content embedding can be generated from this mapping in latent space, and each distance can characterize a relevance metric for a corresponding instance of data.

The method 300 can proceed from the operation 304 to an operation 306, which can include determining an estimated degree of familiarity of the user with the content being accessed by the user. In some implementations, the estimated degree of familiarity can be determined by processing data using one or more heuristic processes and/or one or more trained machine learning models. For example, when a user is viewing an image of a particular landmark, a location of the particular landmark can be determined by processing a screenshot of the image using one or more trained machine learning models. When the location is determined, the automated assistant can determine, with prior permission from the user, a number of times that the user has visited the location. The estimated degree of familiarity can then be generated proportional to the number of visits to the location (e.g., the greater number of visits, the greater estimated degree of familiarity). Alternatively, or additionally, data characterizing other content accessed by the user can be processed, with prior permission from the user, to determine an amount of related content that a user has previously accessed. The estimated degree of familiarity can then be increased or decreased according to a number of times and/or a frequency in which the user accessed related content. In some implementations, the estimated degree of familiarity can be based on a comparison of related content that the user has accessed compared to related content that other users (e.g., users of a similar demographic) have accessed. In this way, users that frequently access certain data (e.g., weather data) may not be considered "more familiar" until their frequency of access and/or diversity of access exceeds the average for the user's demographic.

The method 300 can proceed from the operation 306 to an operation 308, which can include selecting a particular instance(s) of application data based on a relevance metric(s) and/or a familiarity metric(s). In some implementations, selection of an instance of application data can be selected based on whether a threshold value has been satisfied by the relevance data and/or familiarity metric. A threshold can be based on the type of content being accessed, the user who is accessing the content, the device upon which the content is being accessed, contextual data associated with the content, an application that is rendering the content, and/or any other information that can be associated with a threshold value. When a relevance metric and familiarity metric satisfy one or more thresholds, a first instance of data can be selected. Otherwise, when the relevance metric and familiarity metric do not satisfy the one or more thresholds, a second instance of data can be selected. In this way, a first application widget may be rendered when an instance(s) of data for an application satisfies the one or more thresholds, or a second application widget may be rendered when the the instance(s) of data for an application does not satisfy the one or more thresholds.

When a particular instance of data is selected, the method 300 can proceed from the operation 308 to an operation 310. The operation 310 can include generating interface data based on the selected instance(s) of data. The interface data can characterize application content that can be rendered with an application widget at an assistant interface. For example, the application content can include image content, textual content, audio content, and/or any other content that can be rendered via a computing device. In some implementations, the interface data can be customized for a particular application corresponding to the particular instance of data that was determined to be relevant to the content being accessed by the user. For example, when the particular application is a navigation application, the interface data can characterize a map interface, which can include an indication of a location associated with the content being accessed by the user. In some implementations, the interface data can characterize application widgets for applications that a user may prefer over other applications in certain contexts (e.g., a user may prefer using video applications when at home, and podcast applications when the user is away from their home). Alternatively, or additionally, the interface data can characterize playback interface for controlling playback of application content (e.g., audio, video, textual, etc.) that is associated with content being viewed by the user. Alternatively, or additionally, the interface data can characterize one or more application interfaces, which can allow the user to interface (directly or indirectly) with particular application that provided the particular instance of data.

The method 300 can proceed from the operation 310 to an operation 312, which can include causing an interface of a computing device to render a particular application widget(s) based on the interface data. For example, when the content being accessed, or otherwise requested, by the user is rendered at an assistant interface (e.g., an assistant GUI), a particular application widget(s) can also be rendered at the assistant interface. In this way, when the user requests for the automated assistant to render certain content, the automated assistant can provide search results that may be generated from assistant data and/or web data, and also provide one or more interactive application widgets that may be associated with the certain content.

In some implementations, functionality of a particular application widget may be "hidden" from the assistant interface until the user selects the particular application widget. For example, multiple different application widgets can be rendered as selectable GUI elements that, when selected, "expand" to reveal one or more other selectable GUI elements. Application content rendered at each application widget can be based on any corresponding instances of data, and/or other data provided by a corresponding application(s). For example, images and/or text provided by a particular application can be different from the instances of data made available to the automated assistant, and can supplement the content being viewed by the user. Alternatively, or additionally, application widgets can include selectable GUI elements that can correspond to a deep link that, when selected, causes a corresponding application and/or website to perform one or more particular operations.

For example, the method 300 can proceed from the operation 312 to an optional operation 314 of determining whether a particular application widget was selected. When a particular application widget is not selected while the accessed content is being rendered, the method 300 can return to the operation 302 and/or an optional operation 318 for training one or more models according to feedback received during execution of the method 300. Otherwise, when the particular application widget is selected, the method 300 can proceed from the optional operation 314 to an optional operation 316. The optional operation 316 can include causing one or more actions to be performed by communicating with a particular application, which can be an application that is accessible separately from the automated assistant.

For example, the automated assistant can generate selection data that indicates a portion of the particular application widget that the user selected. The selection data can then be communicated to the particular application corresponding to the particular application widget and/or one or more other applications. For example, when the particular application corresponds to travel application, the portion of the particular application widget selected by the user can correspond to a search for travel accommodations to a particular location (e.g., a location associated with the content being accessed by the user). Therefore, in response to receiving the selection data, the particular application can perform a search for travel accommodations and render the search results for the user. In some implementations, action data generated in response to the particular application performing the one or more actions can be rendered for the user by the particular application and/or the automated assistant. In this way, application widgets render for the user can operate as interfaces between the user and the corresponding applications, without necessitating that the user close out of the interface with which the user is accessing the content that served as a basis for the application widgets. The method 300 can then proceed from the operation 316 to the optional operation 318 and/or the operation 302.

Figure 4:
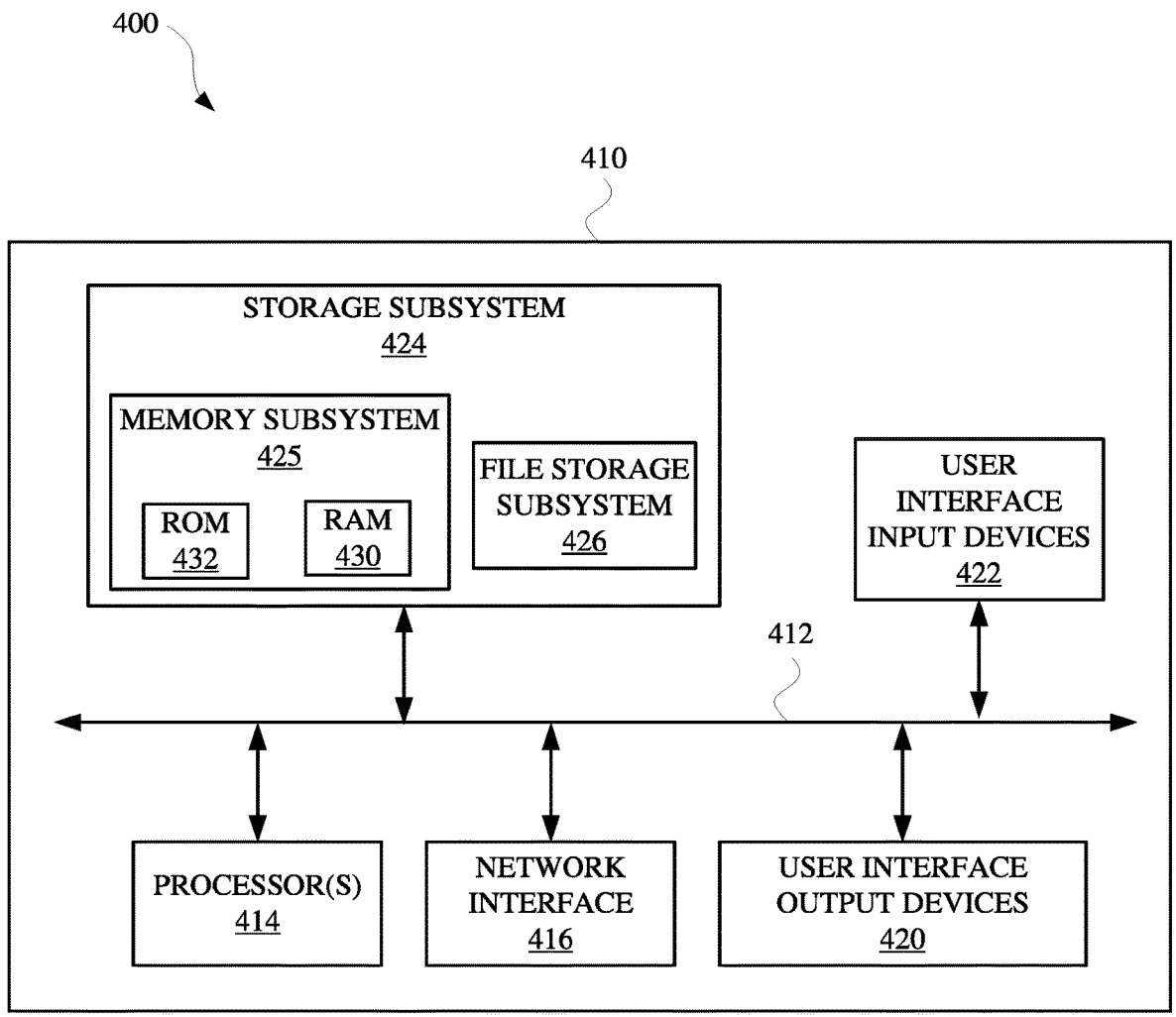
FIG. 4 is a block diagram of an example computer system.

FIG. 4 is a block diagram 400 of an example computer system 410. Computer system 410 typically includes at least one processor 414 which communicates with a number of peripheral devices via bus subsystem 412. These peripheral devices may include a storage subsystem 424, including, for example, a memory 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 300, and/or to implement one or more of system 200, computing device 104, automated assistant, and/or any other application, device, apparatus, and/or module discussed herein.

These software modules are generally executed by processor 414 alone or in combination with other processors. Memory 425 used in the storage subsystem 424 can include a number of memories including a main random-access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a current location of the user), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as determining, by an automated assistant, that a user is selecting a representation of an object via a camera interface of a camera application, wherein the camera interface is rendered at a display interface of a computing device that provides access to the automated assistant. The method can further include generating, based on the user selecting the representation of the object, a familiarity metric that characterizes a degree of familiarity of the user with the object, wherein the familiarity metric is generated further based on data that is accessible to the automated assistant. The method can further include determining, based on the familiarity metric, one or more instances of application widget data provided by one or more applications to serve as a basis for rendering one or more application widgets at the display interface of the computing device, wherein the one or more applications are accessible separately from the automated assistant. The method can further include causing, based on the one or more instances of application widget data, the display interface of the computing device to render the one or more application widgets in response to the user selecting the representation of the object, wherein a particular application widget of the one or more application widgets includes content provided by a particular application of the one or more applications.

In some implementations, an instance of the application widget data is generated by a corresponding application and characterizes interactive content that is available for the user to directly access via the corresponding application. In some implementations, causing the display interface of the computing device to render the one or more application widgets in response to the user selecting the representation of the object includes: causing the particular application widget to be a first application widget when the familiarity metric satisfies a familiarity threshold, and causing the particular application widget to be a second application widget, that is different than the first application widget, when the familiarity metric does not satisfy the familiarity threshold.

In some implementations, generating the familiarity metric that characterizes the degree of familiarity of the user with the object includes: determining whether the data indicates that the automated assistant has rendered content associated with the object represented in the camera interface. In some implementations, generating the familiarity metric that characterizes the degree of familiarity of the user with the object includes: determining whether the data indicates that the user has interacted, via the computing device or another computing device, with content associated with the object. In some implementations, determining the one or more instances of application widget data to serve as the basis for rendering the one or more application widgets at the display interface of the computing device includes: providing, by the automated assistant, one or more requests to each application of the one or more applications, wherein each request of the one or more requests includes request data that characterizes the object represented at the camera interface, and receiving, by the automated assistant, the one or more instances of the application widget data from each application of the one or more applications.

In some implementations, causing the display interface of the computing device to render the one or more application widgets in response to the user selecting the representation of the object includes: causing, by the automated assistant, the particular application widget to be rendered over the camera interface, wherein each application widget of the one or more application widgets includes an interactive graphical user interface (GUI) element. In some implementations, the method can further include receiving, from the user and by the automated assistant, a selection of the content rendered at the particular application widget; and causing, in response to the selection of the content rendered at the particular application widget, the automated assistant to communicate selection data to the particular application of the one or more applications, wherein the selection data indicates the content selected by the user.

In other implementations, a method implemented by one or more processors is set forth as including operations such as receiving, by an automated assistant and from a user, a spoken utterance that embodies a request for the automated assistant to render particular content at a display interface of a computing device via which the automated assistant is accessible. The method can further include determining, by the automated assistant, a relevancy metric that characterizes a degree of relevance of the particular content to one or more instances of application widget data that is accessible to the automated assistant, wherein the application widget data is provided by one or more applications that are accessible separately from the automated assistant. The method can further include determining whether the relevancy metric satisfies a relevancy threshold for rendering one or more application widgets. The method can further include, in response to determining that the relevancy metric satisfies the relevancy threshold for rendering one or more application widgets for the user: generating, based on the relevancy metric and the one or more instances of application widget data, interface data that characterizes one or more application widgets, wherein each application widget of the one or more application widgets corresponds to a respective application of the one or more applications; and causing, by the automated assistant and based on the interface data, a display interface of the computing device to render the one or more applications widgets, wherein a particular application widget of the one or more application widgets includes certain content provided by a particular application of the one or more applications.

In some implementations, determining the relevancy metric that characterizes the degree of relevance of the content to the one or more application widget data includes: processing content data, corresponding to the particular content, and a particular instance of application widget data using one or more trained machine learning models. In some implementations, the one or more trained machine learning models are trained using training data that is generated based on one or more prior interactions between the user and the automated assistant. In some implementations, the particular application includes a navigation application and certain content rendered with the particular application widget includes an image of a map that includes a location associated with particular content requested by the user. In some implementations, the particular application widget is rendered simultaneously with an additional application widget corresponding to an additional application of the one or more applications.

In yet other implementations, a method implemented by one or more processors is set forth as including operations such as receiving, by an automated assistant, a user input that indicates a user is requesting information from the automated assistant, wherein the automated assistant is accessible via a computing device that includes a display interface. The method can further include providing, by the automated assistant and in response to receiving the user input, multiple different applications with access to input data that is based on the user input, wherein the multiple different applications include a first application and a second application that are accessible separately from the automated assistant. The method can further include receiving, by the automated assistant, first data from first the application and second data from the second application, wherein the first data and the second data are generated by the first application and the second application, respectively, based on relevance of the input data to content previously accessed by the user via the first application and relevance of the input data to other content previously accessed by the user via the second application. The method can further include causing, by the automated assistant and in response to the user input, the display interface of the computing device to render a first application widget and a second application widget, wherein the first application widget provides access to the first data provided by the first application, and the second application widget provides access to the second data provided by the second application.

In some implementations, the method can further include receiving, by the automated assistant, a selection input directed to the first application widget; and causing, by the automated assistant and in response to receiving the selection input, the display interface to render additional content based on the first data provided by the first application. In some implementations, the additional content includes an instance of the content previously accessed by the user via the first application. In some implementations, the method can further include receiving, by the automated assistant, a selection input directed to the first application widget; and providing, by the automated assistant and in response to receiving the selection input, selection data to the first application, wherein the selection data indicates a portion of the first application widget that was selected by the user. In some implementations, the method can further include providing the selection data to the first application includes: causing, by the automated assistant, the selection data to be provided to a server device that is associated with the first application, wherein the user previously accessed the content of the first application via another computing device that is separate from the computing device and the server device.

In some implementations, the method can further include determining, based on the first data from first the application and second data from the second application, familiarity data that indicates a degree of familiarity of the user with the first data, and another degree of familiarity of the user with the second data, wherein the first application widget and the second application widget are rendered based on the familiarity data. In some implementations, the first application widget is rendered with certain content when the degree of familiarity of the user with the first data satisfies a familiarity threshold, and the first application widget is rendered with different content when the degree of familiarity of the user with the first data does not satisfy the familiarity threshold.

We claim:

1. A method implemented by one or more processors, the method comprising:
   determining, by an automated assistant, that a user is selecting a representation of an object via a camera interface of a camera application,
      wherein the camera interface is rendered at a display interface of a computing device that provides access to the automated assistant;
   generating, based on the user selecting the representation of the object, a familiarity metric that characterizes a degree of familiarity of the user with the object,
      wherein the familiarity metric is generated further based on data that is accessible to the automated assistant;
   determining, based on the familiarity metric, one or more instances of application widget data provided by one or more applications to serve as a basis for rendering one or more application widgets at the display interface of the computing device,
      wherein the one or more applications are accessible separately from the automated assistant; and
   causing, based on the one or more instances of application widget data, the display interface of the computing device to render the one or more application widgets in response to the user selecting the representation of the object,
      wherein a particular application widget of the one or more application widgets includes content provided by a particular application of the one or more applications.

2. The method of claim 1, wherein an instance of the application widget data is generated by a corresponding application and characterizes interactive content that is available for the user to directly access via the corresponding application.

3. The method of claim 1, wherein causing the display interface of the computing device to render the one or more application widgets in response to the user selecting the representation of the object includes:
   causing the particular application widget to be a first application widget when the familiarity metric satisfies a familiarity threshold, and causing the particular application widget to be a second application widget, that is different than the first application widget, when the familiarity metric does not satisfy the familiarity threshold.

4. The method of claim 1, wherein generating the familiarity metric that characterizes the degree of familiarity of the user with the object includes:
   determining whether the data indicates that the automated assistant has rendered content associated with the object represented in the camera interface.

5. The method of claim 1, wherein generating the familiarity metric that characterizes the degree of familiarity of the user with the object includes:
   determining whether the data indicates that the user has interacted, via the computing device or another computing device, with content associated with the object.

6. The method of claim 1, wherein determining the one or more instances of application widget data to serve as the basis for rendering the one or more application widgets at the display interface of the computing device includes:
   providing, by the automated assistant, one or more requests to each application of the one or more applications,
      wherein each request of the one or more requests includes request data that characterizes the object represented at the camera interface, and
   receiving, by the automated assistant, the one or more instances of the application widget data from each application of the one or more applications.

7. The method of claim 1, wherein causing the display interface of the computing device to render the one or more application widgets in response to the user selecting the representation of the object includes:
   causing, by the automated assistant, the particular application widget to be rendered over the camera interface,
      wherein each application widget of the one or more application widgets includes an interactive graphical user interface (GUI) element.

8. The method of claim 7, further comprising:
   receiving, from the user and by the automated assistant, a selection of the content rendered at the particular application widget; and
   causing, in response to the selection of the content rendered at the particular application widget, the automated assistant to communicate selection data to the particular application of the one or more applications, wherein the selection data indicates the content selected by the user.

9. A computing device comprising:
   a camera;
   a display interface;
   memory storing instructions; and
   one or more processors operable to execute the instructions to:
   determine that a user is selecting a representation of an object via a camera interface of a camera application, wherein the camera interface renders, at the display interface, a feed from the camera;
   generate, based on the user selecting the representation of the object, a familiarity metric that characterizes a degree of familiarity of the user with the object,
      wherein the familiarity metric is generated further based on data that is accessible to an automated assistant;
   determine, based on the familiarity metric, one or more instances of application widget data provided by one or more applications to serve as a basis for rendering one or more application widgets at the display interface of the computing device,
      wherein the one or more applications are accessible separately from the automated assistant; and
   cause, based on the one or more instances of application widget data, the display interface of the computing device to render the one or more application widgets in response to the user selecting the representation of the object,
      wherein a particular application widget of the one or more application widgets includes content provided by a particular application of the one or more applications.

10. The computing device of claim 9, wherein an instance of the application widget data is generated by a corresponding application and characterizes interactive content that is available for the user to directly access via the corresponding application.

11. The computing device of claim 9, wherein in causing the display interface of the computing device to render the one or more application widgets in response to the user selecting the representation of the object one or more of the processors are to:
   cause the particular application widget to be a first application widget when the familiarity metric satisfies a familiarity threshold, and
   cause the particular application widget to be a second application widget, that is different than the first application widget, when the familiarity metric does not satisfy the familiarity threshold.

12. The computing device of claim 9, wherein in generating the familiarity metric that characterizes the degree of familiarity of the user with the object one or more of the processors are to:
   determine whether the data indicates that the automated assistant has rendered content associated with the object represented in the camera interface.

13. The computing device of claim 9, wherein in generating the familiarity metric that characterizes the degree of familiarity of the user with the object one or more of the processors are to:
   determine whether the data indicates that the user has interacted, via the computing device or another computing device, with content associated with the object.

14. The computing device of claim 9, wherein in determining the one or more instances of application widget data to serve as the basis for rendering the one or more application widgets at the display interface of the computing device one or more of the processors are to:
   provide one or more requests to each application of the one or more applications, wherein each request of the one or more requests includes request data that characterizes the object represented at the camera interface, and
   receive the one or more instances of the application widget data from each application of the one or more applications.

15. The computing device of claim 9, wherein in causing the display interface of the computing device to render the one or more application widgets in response to the user selecting the representation of the object one or more of the processors are to:
   cause the particular application widget to be rendered over the camera interface, wherein each application widget of the one or more application widgets includes an interactive graphical user interface (GUI) element.

16. The computing device of claim 15, wherein one or more of the processors are further operable to execute the instructions to:
   receive a user selection of the content rendered at the particular application widget; and
   causing, in response to the user selection of the content rendered at the particular application widget, the automated assistant to communicate selection data to the particular application of the one or more applications, wherein the selection data indicates the content selected by the user.

* * * * *